(12) United States Patent
Harada

(10) Patent No.: US 9,992,406 B2
(45) Date of Patent: Jun. 5, 2018

(54) ELECTRONIC DEVICE, CONTROL METHOD, AND NON-TRANSITORY STORAGE MEDIUM FOR IMAGE CORRECTION RESPONSIVE TO ENVIRONMENT CHANGE

(71) Applicant: KYOCERA Corporation, Kyoto-shi, Kyoto (JP)

(72) Inventor: Naoki Harada, Machida (JP)

(73) Assignee: KYOCERA CORPORATION, Kyoto (JP)

( * ) Notice: Subject to any disclaimer, the term of this patent is extended or adjusted under 35 U.S.C. 154(b) by 0 days. days.

(21) Appl. No.: 15/190,184

(22) Filed: Jun. 23, 2016

(65) Prior Publication Data

US 2016/0381288 A1 Dec. 29, 2016

(30) Foreign Application Priority Data

Jun. 26, 2015 (JP) .................................. 2015-129240

(51) Int. Cl.
*H04N 5/225* (2006.01)
*H04N 5/232* (2006.01)
*H04N 1/60* (2006.01)
*H04N 9/73* (2006.01)

(52) U.S. Cl.
CPC ....... *H04N 5/23216* (2013.01); *H04N 1/6088* (2013.01); *H04N 5/23258* (2013.01); *H04N 5/23267* (2013.01); *H04N 5/23293* (2013.01); *H04N 9/735* (2013.01)

(58) Field of Classification Search
CPC .............................. G02B 23/22; G03B 17/08

USPC ........................................................... 348/81
See application file for complete search history.

(56) References Cited

U.S. PATENT DOCUMENTS

| 2006/0114335 | A1* | 6/2006 | Hara | H04N 9/735 348/223.1 |
|---|---|---|---|---|
| 2007/0236564 | A1* | 10/2007 | Takita | H04N 7/183 348/81 |
| 2008/0151057 | A1* | 6/2008 | Takita | G03B 17/08 348/207.1 |
| 2008/0231696 | A1* | 9/2008 | Kodama | G03B 17/00 348/81 |

(Continued)

FOREIGN PATENT DOCUMENTS

JP 2012-123740 A 6/2012

*Primary Examiner* — Twyler L Haskins
*Assistant Examiner* — Dwight Alex C Tejano
(74) *Attorney, Agent, or Firm* — Hauptman Ham, LLP

(57) ABSTRACT

According to one aspect, an electronic device includes an image acquiring unit; a display that is configured to display an image acquired by the image acquiring unit; a first sensor that is configured to measure a first information on an environment around the electronic device for detecting a change in the environment; at least one controller that is configured to detect the change and, when the change is detected, conduct correction of an image acquired by the image acquiring unit; and a second sensor that is configured to measure a second information on a movement of the electronic device. The at least one controller is configured to, when shooting of a movie has been started by the image acquiring unit before the change is detected, set the adjustment duration time for correction of the image in accordance with the second information.

8 Claims, 9 Drawing Sheets

(56) References Cited

U.S. PATENT DOCUMENTS

| | | | |
|---|---|---|---|
| 2009/0015514 A1* | 1/2009 | Suzuki | B63C 11/02 345/3.1 |
| 2009/0115844 A1* | 5/2009 | Cheng | H04N 5/232 348/81 |
| 2009/0201390 A1* | 8/2009 | Mimura | H04N 5/232 348/222.1 |
| 2011/0007145 A1* | 1/2011 | Shigeeda | H04N 5/232 348/81 |
| 2011/0058085 A1* | 3/2011 | Ito | G03B 13/00 348/333.02 |
| 2011/0074945 A1* | 3/2011 | Watanabe | H04N 5/232 348/81 |
| 2011/0228074 A1* | 9/2011 | Parulski | G03B 15/05 348/81 |
| 2011/0292202 A1* | 12/2011 | Tanaka | G01S 19/49 348/81 |
| 2012/0146924 A1 | 6/2012 | Inoue | |

* cited by examiner

| ACCELERATION [A] | ADJUSTMENT DURATION TIME [T] |
|---|---|
| a1≤A<a2 | T1 |
| a2≤A<a3 | T2(>T1) |
| ... | ... |

ELECTRONIC DEVICE, CONTROL METHOD, AND NON-TRANSITORY STORAGE MEDIUM FOR IMAGE CORRECTION RESPONSIVE TO ENVIRONMENT CHANGE

CROSS-REFERENCE TO RELATED APPLICATION

The present application claims priority to and incorporates by reference the entire contents of Japanese Patent Application No. 2015-129240 filed in Japan on Jun. 26, 2015.

FIELD

The subject application relates to an electronic device, a control method, and a non-transitory storage medium.

BACKGROUND

Conventionally, there are electronic devices that change the display mode of information, displayed on the display surface, if water adhering to the display surface is detected (for example, see Japanese Patent Application Laid-open No. 2012-123740).

SUMMARY

According to one aspect of embodiments, there is provided an electronic device including an image acquiring unit, a display that is configured to display an image acquired by the image acquiring unit, a first sensor that is configured to measure a first information on an environment around the electronic device for detecting a change in the environment, at least one controller that is configured to detect the change and, when the change is detected, conduct correction of an image acquired by the image acquiring unit, and a second sensor that is configured to measure a second information on a movement of the electronic device. The at least one controller is configured to, when shooting of a movie has been started by the image acquiring unit before the change is detected, set an adjustment duration time for correction of the image in accordance with the second information.

According to one aspect of embodiments, there is provided a control method implemented by an electronic device including an image acquiring unit and a display that is configured to display an image acquired by the image acquiring unit. The control method includes measuring a first information on an environment around the electronic device for detecting a change in the environment, determining the change, conducting correction of an image acquired by the image acquiring unit when the change is detected, measuring a second information on a movement of the electronic device; and setting an adjustment duration time for correction of the image in accordance with the second information when shooting of a movie has been started by the image acquiring module before the change is detected.

According to one aspect of embodiments, there is provided a non-transitory storage medium that stores a control program for causing, when executed by an electronic device including an image acquiring unit and a display that is configured to display an image acquired by the image acquiring unit, to execute, measuring a first information on an environment around the electronic device for detecting a change in the environment, determining the change, conducting correction of the image acquired by the image acquiring unit when the change is detected, measuring a second information on a movement of the electronic device, and setting an adjustment duration time for correction of the image in accordance with the second information when shooting of a movie has been started by the image acquiring unit before the change is detected.

DETAILED DESCRIPTION

With reference to the drawings, a detailed explanation is given of embodiments for implementing an electronic device, a control method, and a control program according to the subject application. In the following explanation, a smartphone is used as an example of the electronic device according to the subject application.

Figure 1:
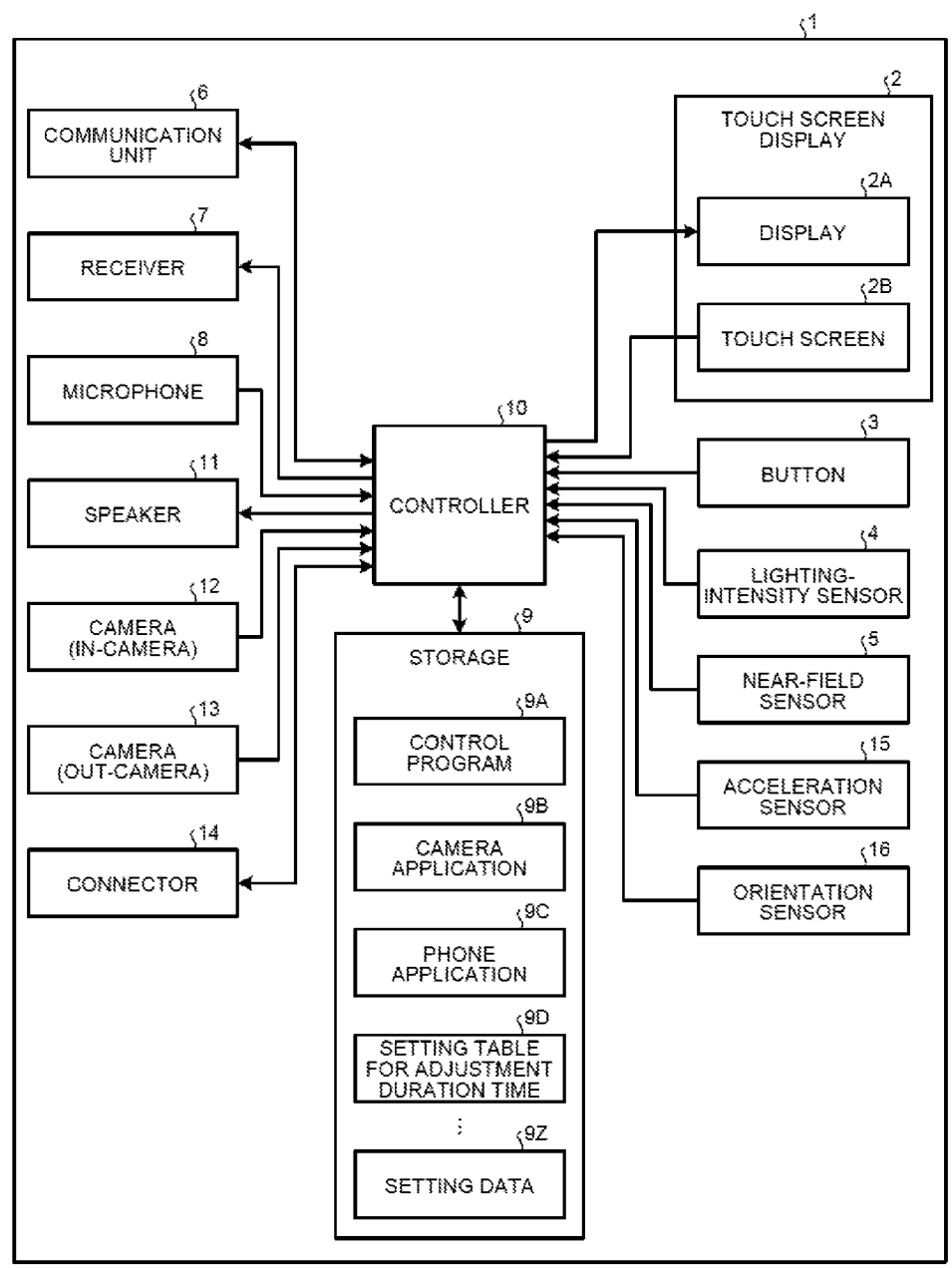
FIG. 1 is a block diagram that illustrates an example of the functional configuration of a smartphone according to embodiments.

With reference to FIG. 1, an explanation is given of an example of the functional configuration of the electronic device according to embodiments. FIG. 1 is a block diagram that illustrates an example of the functional configuration of the smartphone according to embodiments. In the following explanation, the same reference numeral is sometimes applied to the same components. Furthermore, duplicated explanations are omitted in some cases. Moreover, a smartphone 1 is sometimes referred to as the "subject device".

As illustrated in FIG. 1, the smartphone 1 includes a touch screen display 2, a button 3, a lighting-intensity sensor 4, a near-field sensor 5, a communication unit 6, a receiver 7, a microphone 8, a storage 9, a controller 10, a speaker 11, a camera 12, a camera 13, a connector 14, an acceleration sensor 15, and an orientation sensor 16.

The touch screen display 2 includes a display 2A and a touch screen 2B. For example, the display 2A and the touch screen 2B may be arranged in an overlapped manner, may be arranged side by side, or may be arranged apart from each other. In the touch screen display 2, if the display 2A and the touch screen 2B are arranged in an overlapped manner, for example, one or more sides of the display 2A do not need to conform to any side of the touch screen 2B.

The display 2A includes a display device, such as a liquid crystal display (LCD), an organic electro-luminescence (EL) display (OELD), or an inorganic electro-luminescence (EL) display (IELD). The display 2A is capable of displaying texts, images, symbols, graphics, or the like. The screen that includes texts, images, symbols, graphics, or the like, presented by the display 2A, includes the screen that is called a lock screen, the screen that is called a home screen, and the application screen that is displayed while an application is being executed. The home screen is also called a desktop, a standby screen, an idle screen, a regular screen, an app-list screen, or a launcher screen. The display 2A is an example of a display module.

The touch screen 2B detects that a finger, pen, stylus pen, or the like, is brought into contact with or is located close to the touch screen 2B. The touch screen 2B may detect locations on the touch screen 2B when multiple fingers, pens, stylus pens, or the like, are brought into contact with or are located close to the touch screen 2B. Multiple fingers, pens, stylus pens, or the like, detected by the touch screen 2B, are sometimes referred to as the "finger". The location where the finger, detected by the touch screen 2B, is in contact or is located close is sometimes referred to as the "detection location". The touch screen 2B notifies the controller 10 of the contact of the finger with the touch screen 2B together with the detection location. The touch screen display 2, which includes the touch screen 2B, is capable of performing operations that may be performed by the touch screen 2B. In other words, the operations that are performed by the touch screen 2B may be performed by the touch screen display 2.

Figure 2:
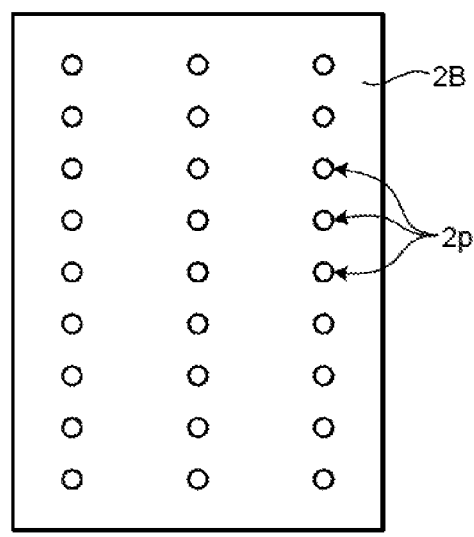
FIG. 2 is a diagram that illustrates an example of sensor electrodes on a touch screen according to embodiments.
Figure 3:
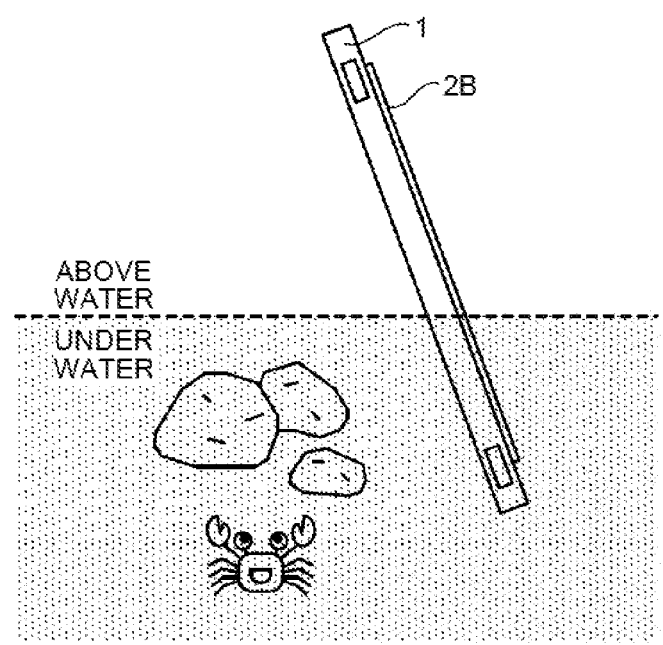
FIG. 3 is a diagram that illustrates an example of the smartphone that is under water according to embodiments.
Figures 4, 5:
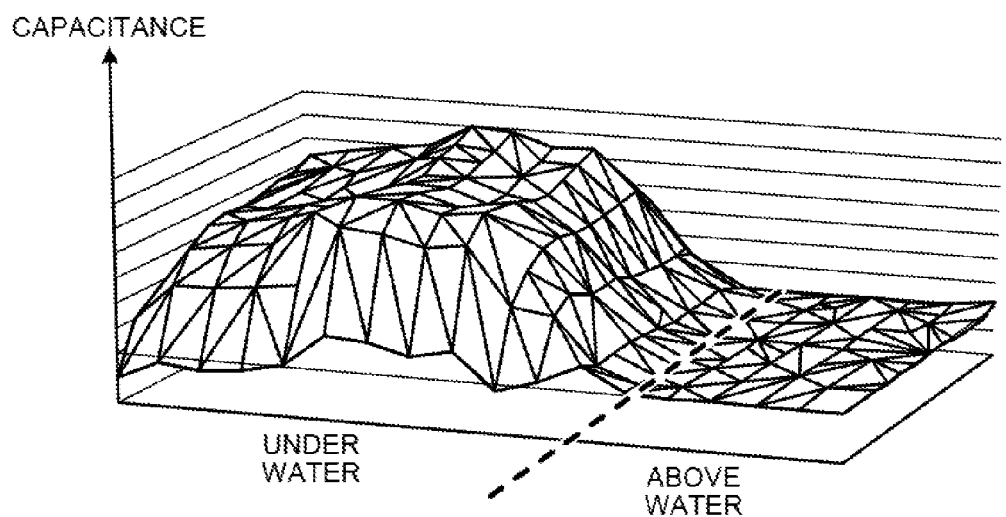
FIG. 4 is a diagram that illustrates an example of the capacitance according to embodiments.
FIG. 5 is a diagram that illustrates an example of the data structure of a setting table for the adjustment duration time according to embodiments.

The touch screen 2B measures the information for detecting a change in the ambient environment of the subject device from above-water to under-water and a change in the ambient environment of the subject device from under-water to above-water. In the following explanation, a change in the ambient environment of the subject device from above-water to under-water and a change in the ambient environment from under-water to above-water are sometimes referred to as a "change in the ambient environment". FIG. 2 is a diagram that illustrates an example of sensor electrodes on the touch screen 2B according to embodiments. FIG. 3 is a diagram that illustrates an example of the smartphone 1 that is under water according to embodiments. FIG. 4 is a diagram that illustrates an example of the capacitance according to embodiments. According to an example of embodiments, if the touch screen 2B uses a capacitive system as its detection system, it measures the capacitance. As in the example that is illustrated in FIG. 2, the touch screen 2B applies a predetermined signal to each of sensor electrodes 2p that are spread over the touch screen 2B in a grid pattern, and it repeatedly reads the output value from each of the sensor electrodes 2p. Thus, the touch screen 2B is capable of measuring the capacitance. As illustrated in FIG. 3, if a state is such that part of the smartphone 1 is under water, the capacitance, measured by the touch screen 2B, largely differs in the distribution of the capacitance of above-water and in the distribution of the capacitance of under-water, as illustrated in FIG. 4. Therefore, the controller 10 is capable of detecting a change in the ambient environment of the subject device on the basis of the distribution of the capacitance that is measured by the touch screen 2B. The touch screen 2B is an example of an environment measuring module.

If the touch screen 2B uses a resistive layer system or a load detection system as a different detection system instead of the capacitive system, it may detect, for example, a change in the level of the voltage as the information for detecting a change in the ambient environment of the subject device. If the touch screen 2B uses a surface acoustic wave system as a different detection system instead of the capacitive system, it may detect, for example, attenuation of the surface acoustic wave, generated by the subject device, as the information for detecting a change in the ambient environment of the subject device. If the touch screen 2B uses an infrared system as a different detection system instead of the capacitive system, it may detect, for example, attenuation of the infrared rays, generated by the subject device, as the information for detecting a change in the ambient environment of the subject device.

The controller 10 determines the type of gesture on the basis of at least one of the contact that is detected by the touch screen 2B, the location where the contact is detected, a change in the location where the contact is detected, an interval in which the contact is detected, and the number of times the contact is detected. The gesture is an operation that is performed on the touch screen 2B (the touch screen display 2) by using the finger. Examples of the gesture that is determined by the controller 10 via the touch screen 2B include, but are not limited to, touch, long touch, release, swipe, tap, double tap, long tap, drag, flick, pinch-in, pinch-out, etc.

The button 3 receives operation inputs from a user. There may be a single or multiple numbers of the buttons 3.

The lighting-intensity sensor 4 detects the lighting intensity. The lighting intensity is the value of a light flux that enters a unit area of the measurement surface of the lighting-intensity sensor 4. The lighting-intensity sensor 4 is used to, for example, adjust the brightness of the display 2A.

The near-field sensor 5 detects the presence of an object in the neighborhood in a non-contact manner. The near-field sensor 5 detects the presence of an object on the basis of a change in the magnetic field, a change in the return time of the reflected wave of an ultrasonic wave, or the like. For example, the near-field sensor 5 detects that the display 2A and the face are located close to each other. The lighting-intensity sensor 4 and the near-field sensor 5 may be configured as a single sensor. The lighting-intensity sensor 4 may be used as a near-field sensor.

The communication unit 6 performs a wireless communication. Examples of the wireless communication standard, supported by the communication unit 6, include, but are not limited to, the communication standard of a cellular phone, such as 2G, 3G, or 4G, the communication standard of close-range wireless, etc. Examples of the communication standard of a cellular phone include, but are not limited to, Long Term Evolution (LTE), Wideband Code Division Multiple Access (W-CDMA), Worldwide Interoperability for Microwave Access (WiMAX) (registered trademark), CDMA2000, Personal Digital Cellular (PDC), Global System for Mobile Communications (GSM) (registered trademark), Personal Handy-phone System (PHS), etc. Examples of the communication standard of the close-range wireless include, but are not limited to, IEEE802.11, Bluetooth (registered trademark), Infrared Data Association (IrDA), Near Field Communication (NFC), Wireless Personal Area Network (WPAN), etc. Examples of the communication standard of WPAN include, but are not limited to, ZigBee (registered trademark), etc. The communication unit 6 may support one or more of the above-described communication standards. The communication unit 6 may support a wired communication. Examples of the wired communication include, but are not limited to, Ethernet (registered trademark), fiber channel, etc.

The receiver 7 is an example of a sound output module. The receiver 7 outputs sound signals, transmitted from the controller 10, as sound. The receiver 7 is capable of outputting, for example, sound of movies that are reproduced by the smartphone 1, sound of music, or voice of the caller during a telephone call. The microphone 8 is an example of a sound input module. The microphone 8 converts the voice of a user, or the like, into sound signals and transmits them to the controller 10.

The storage 9 is capable of storing programs and data. The storage 9 may be used as a task area for temporarily storing processing results of the controller 10. The storage 9 may include any non-transitory storage medium, such as a semiconductor storage medium or a magnetic storage medium. The storage 9 may include multiple types of storage media. The storage 9 may include the combination of a storage medium, such as a memory card, optical disk, or magneto-optical disk, and a reading device for the storage medium. The storage 9 may include a storage device that is used as a temporary memory area, such as a random access memory (RAM).

The programs, stored in the storage 9, include the applications that are executed in the foreground or background and the control programs (not illustrated) that support execution of the applications. The screen of the application is displayed on the display 2A when it is executed in the foreground, for example. Examples of the control programs include, but are not limited to, the OS, etc. The applications and the basic programs may be installed in the storage 9 via a wireless communication of the communication unit 6 or via a non-transitory storage medium.

The storage 9 stores a control program 9A, a camera application 9B, a phone application 9C, a setting table 9D and setting data 9Z for the adjustment duration time, or the like.

The control program 9A is capable of providing the function to continuously determine a change in the ambient environment on the basis of a measurement result of the touch screen 2B. If a change in the ambient environment is detected, the control program 9A cooperates with the function that is provided by the camera application 9B. Due to the cooperation, the control program 9A may provide the function to switch each of the operation settings with regard to operations of the camera 12 (or the camera 13) and the settings with regard to automatic correction of an image acquired by the camera 12 (or the camera 13) in accordance with the changed ambient environment. With regard to the automatic correction of an image, the control program 9A may provide the function to conduct automatic correction on at least one of the distortion of an image, acquired by the camera 12 (or the camera 13), and the color balance of the image. The control program 9A may provide the function to set the adjustment duration time for correcting an image on the basis of the value of the acceleration, measured by the acceleration sensor 15, if shooting of a movie has been started by the camera 12 (or the camera 13) when a change in the ambient environment is detected. The control program 9A may provide the function to set the adjustment duration time on the basis of the value of the acceleration, measured by the acceleration sensor 15, before a change in the ambient environment is detected. The control program 9A may provide the function to set the adjustment duration time on the basis of the value of the acceleration, measured by the acceleration sensor 15, after a change in the ambient environment is detected.

The camera application 9B may provide the function to conduct capturing, editing, management, and the like, of still images and moving images. The phone application 9C may provide the calling function to make a call via a wireless communication.

The setting table 9D for the adjustment duration time includes the correspondence relationship between the value of the acceleration and the adjustment duration time. FIG. 5 is a diagram that illustrates an example of the data structure of the setting table for the adjustment duration time according to embodiments. As illustrated in FIG. 5, the setting table 9D for the adjustment duration time includes the data on the correspondence relationship between the range of values of the acceleration, divided by a predetermined range, and the adjustment duration time for making correction on an image. As illustrated in FIG. 5, in the setting table 9D for the adjustment duration time, the range of values of the acceleration is related to the adjustment duration time that is adjusted such that, as the value of the acceleration is smaller, the correction amount is gradually changed so that the final correction amount is reached in a longer time. The example illustrated in FIG. 5 is only one example of embodiments. For example, the setting table 9D for the adjustment duration time may be configured such that the value of the acceleration is related to the variable that is multiplied by the reference value of the adjustment duration time so as to calculate the adjustment duration time.

The setting data 9Z is configured such that it includes various types of data that are used for a process that is executed in accordance with the function, provided by the control program 9A, or the like, and for a process that is executed in accordance with the function, provided by the camera application 9B, or the like. The setting data 9Z may include data on the automatic correction amount that is used to correct distortion of an image and the automatic correction amount that is used to correct the color balance of an image.

The controller 10 includes a calculation processing device. Examples of the calculation processing device include, but are not limited to, a central processing unit (CPU), System-on-a-Chip (SoC), micro control unit (MCU), field-programmable gate array (FPGA), a coprocessor, etc. The controller 10 integrally controls an operation of the smartphone 1 to implement various functions. The controller 10 is an example of a controller.

Specifically, the controller 10 refers to the data, stored in the storage 9, as needed and executes a command, included in the program that is stored in the storage 9. The controller 10 controls a functional module on the basis of data and a command, thereby implementing various functions. Examples of the functional module include, but are not limited to, at least one of the display 2A, the communication unit 6, the microphone 8, and the speaker 11, etc. The controller 10 sometimes changes the control in accordance with a detection result of a detecting module. Examples of the detecting module include, but are not limited to, at least one of the touch screen 2B, the button 3, the lighting-intensity sensor 4, the near-field sensor 5, the microphone 8, the camera 12, the camera 13, the acceleration sensor 15, and the orientation sensor 16, etc.

The controller 10 executes the control program 9A so as to cooperate with the function that is provided by the camera application 9B, thereby performing each of the following processes. Specifically, the controller 10 is capable of performing a process to continuously determine a change in the ambient environment on the basis of a measurement result of the touch screen 2B. The controller 10 is capable of performing a process to switch each of the operation settings with regard to operations of the camera 12 (or the camera 13) and the settings with regard to the automatic correction of images that are acquired by the camera 12 (or the camera 13) in accordance with the changed ambient environment when it detects the change in the ambient environment. With regard to the automatic correction of an image, the controller 10 is capable of performing automatic correction on at least one of the distortion of an image, acquired by the camera 12 (or the camera 13), or the color balance of the image when it detects a change in the ambient environment. The controller 10 is capable of setting the adjustment duration time for correcting an image on the basis of the value of the acceleration, measured by the acceleration sensor 15, if shooting of a movie has been started by the camera 12 (or the camera 13) when a change in the ambient environment is detected.

Figure 6:
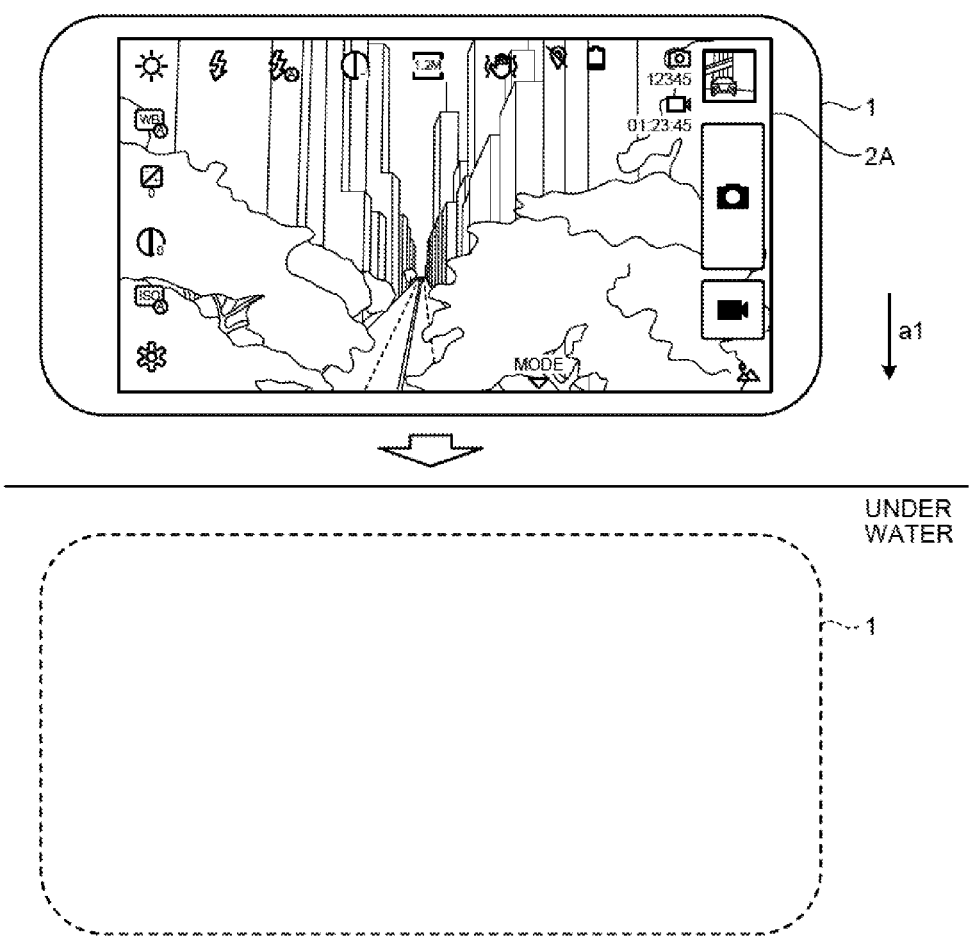
FIG. 6 is a diagram that illustrates an example of the acceleration that acts on the smartphone according to embodiments.
Figure 7:
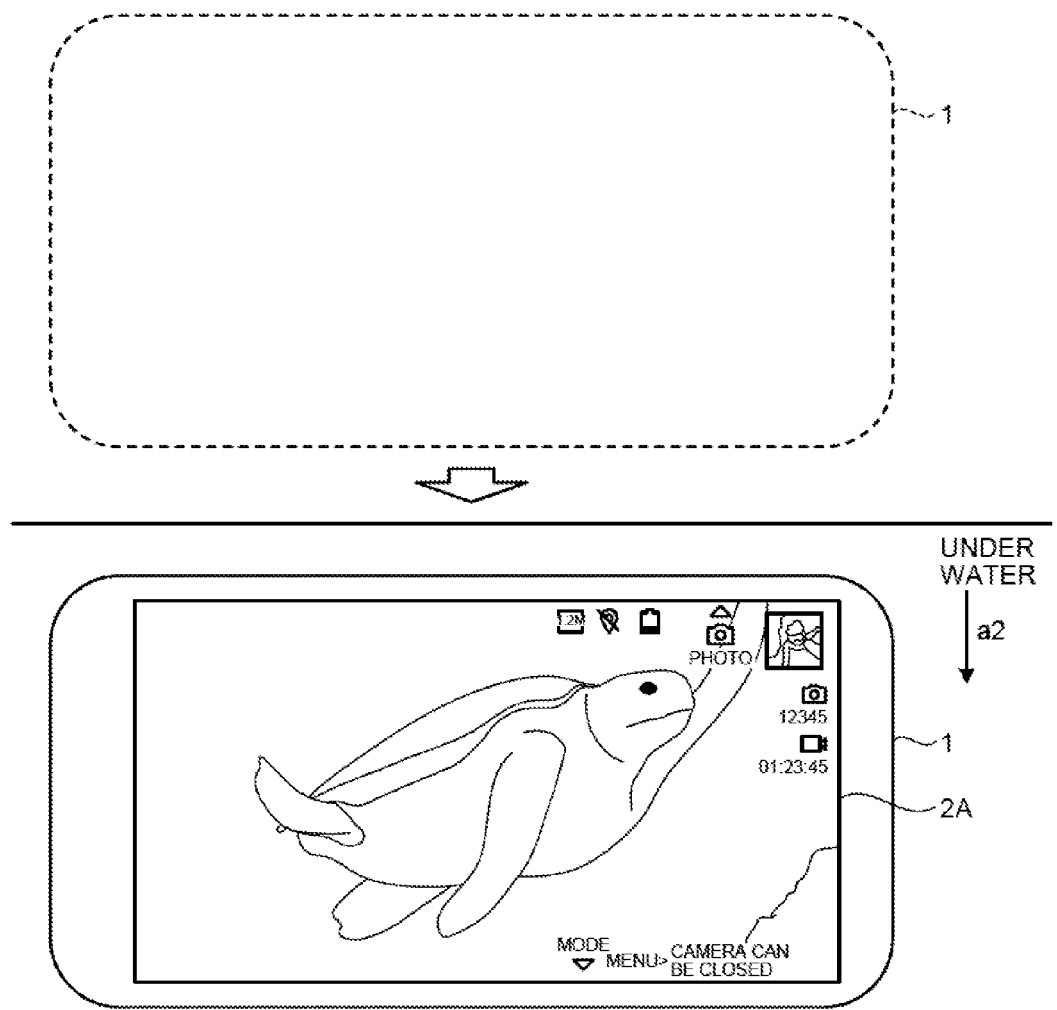
FIG. 7 is a diagram that illustrates an example of the acceleration that acts on the smartphone according to embodiments.

To set the adjustment duration time, the controller 10 may set the adjustment duration time on the basis of the value of the acceleration, measured by the acceleration sensor 15, before a change in the ambient environment is detected. Alternatively, the controller 10 may set the adjustment duration time on the basis of the value of the acceleration, measured by the acceleration sensor 15, after a change in the ambient environment is detected. FIGS. 6 and 7 are diagrams that illustrate examples of the acceleration that acts on the smartphone 1 according to embodiments. FIG. 6 illustrates an example of the acceleration that is measured immediately before the smartphone 1 enters water. FIG. 7 illustrates an example of the acceleration that is measured immediately after the smartphone 1 enters water. As in the example illustrated in FIG. 6, if the value of the acceleration, measured immediately before the smartphone 1 enters water, is acceleration a1, the controller 10 may read an adjustment duration time T1, which corresponds to the acceleration a1, from the setting table 9D (see FIG. 5) for the adjustment duration time and set it as the adjustment duration time. Conversely, as in the example illustrated in FIG. 7, if the value of the acceleration, measured immediately after the smartphone 1 enters water, is acceleration a2, the controller 10 may read an adjustment duration time T2, which corresponds to the acceleration a2, from the setting table 9D (see FIG. 5) for the adjustment duration time and set it as the adjustment duration time.

Figure 8:
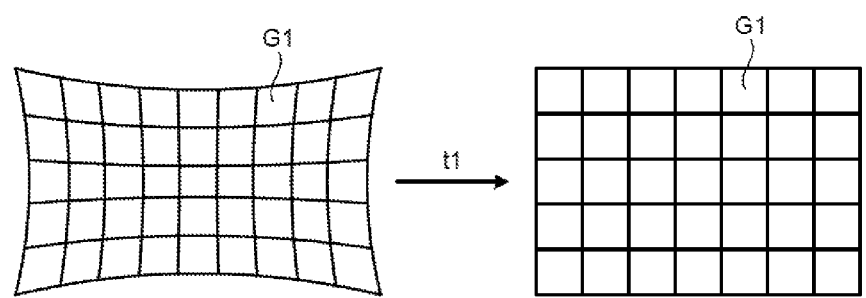
FIG. 8 is a diagram that illustrates an example of the correction on distortion of an image according to embodiments.
Figure 9:
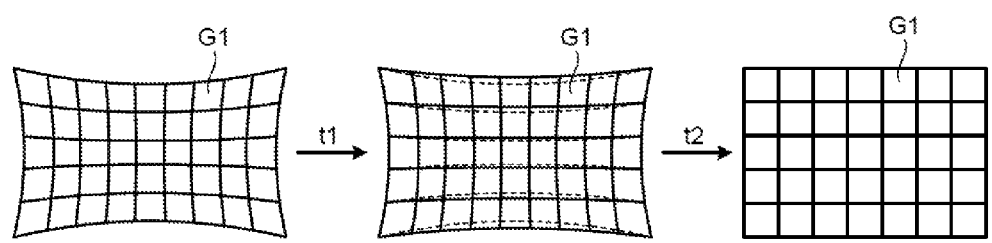
FIG. 9 is a diagram that illustrates an example of the correction on distortion of an image according to embodiments.

The controller 10 makes an adjustment for the correction of at least one of the distortion and the color balance of an image by using the entire adjustment duration time so that the elapse of the adjustment duration time coincides with termination of the adjustment for the correction of the image. In the setting table 9D for the adjustment duration time, a smaller value of the acceleration is related to a longer adjustment duration time. Therefore, as the value of the acceleration is smaller, adjustment for the correction on distortion, or the like, is conducted for a longer time. FIGS. 8 and 9 are diagrams that illustrate examples of the correction on distortion of an image according to embodiments. As illustrated in FIG. 8, in the case of the correction on distortion of an image, if the adjustment duration time is t1, the correction value of the distortion is gradually changed so that the elapse of t1 coincides with termination of the adjustment for the correction of an image G1. Conversely, as illustrated in FIG. 9, if the adjustment duration time is t1+t2, the elapse of t1+t2 coincides with termination of the adjustment for the correction of the image G1. That is, in the smartphone 1 according to embodiments, as the speed of the subject device entering water is slower, the adjustment duration time is longer, and the final correction amount for the distortion of an image is reached slowly. Therefore, compared to a conventional case where correction of an image is immediately conducted in accordance with a change in the ambient environment, it is possible to reduce uncomfortable feelings of the user who views the image on the display 2A, for example, when the image, displayed on the display 2A, is automatically corrected in accordance with a change in the ambient environment of the subject device during the shooting of a movie.

The speaker 11 includes a sound output module. The speaker 11 outputs sound signals, transmitted from the controller 10, as sound. For example, the speaker 11 may output the ring tone and music. One of the receiver 7 and the speaker 11 may perform the function of the other one of them.

The camera 12 and the camera 13 are capable of converting a captured image into electric signals. The camera 12 may be an in-camera that captures an object that faces the display 2A. The camera 13 may be an out-camera that captures an object that faces the opposite side of the display 2A. The camera 12 and the camera 13 may be installed in the smartphone 1 in a state such that they are integrated functionally and physically as a camera unit that may be used by switching the in-camera and the out-camera.

The connector 14 is a terminal to which a different device is connected. The connector 14 may be a general-purpose terminal, such as a Universal Serial Bus (USB), High-Definition Multimedia Interface (HDMI) (registered trademark), Light Peak (Thunderbolt (registered trademark)), or earphone mic connector. The connector 14 may be a dedicated terminal, such as a Dock connector. Examples of the device that is connected to the connector 14 include, but are not limited to, an external storage, speaker, smartphone, etc.

The acceleration sensor 15 measures the direction and the level of the acceleration that acts on the smartphone 1. According to an example of embodiments, the acceleration sensor 15 may internally store the measured value of the acceleration. The orientation sensor 16 detects, for example, the direction of the earth's magnetism so as to detect the orientation (direction) of the smartphone 1 on the basis of the direction of the earth's magnetism.

The smartphone 1 may include a GPS receiver and a vibrator in addition to the above-described functional modules. The GPS receiver is capable of receiving radio signals in a predetermined frequency band from a GPS satellite. The GPS receiver performs a demodulation process on the received radio signals and transmits the processed signals to the controller 10. The GPS receiver supports a process to calculate the current position of the smartphone 1. The vibrator vibrates part or all of the smartphone 1. The vibrator includes, for example, a piezoelectric element or an eccentric motor to generate vibration. A functional module, such as a battery, which is necessarily used to keep the functions of the smartphone 1, and a controller, which is necessarily used to perform a control on the smartphone 1, are installed in the smartphone 1.

Figure 10:
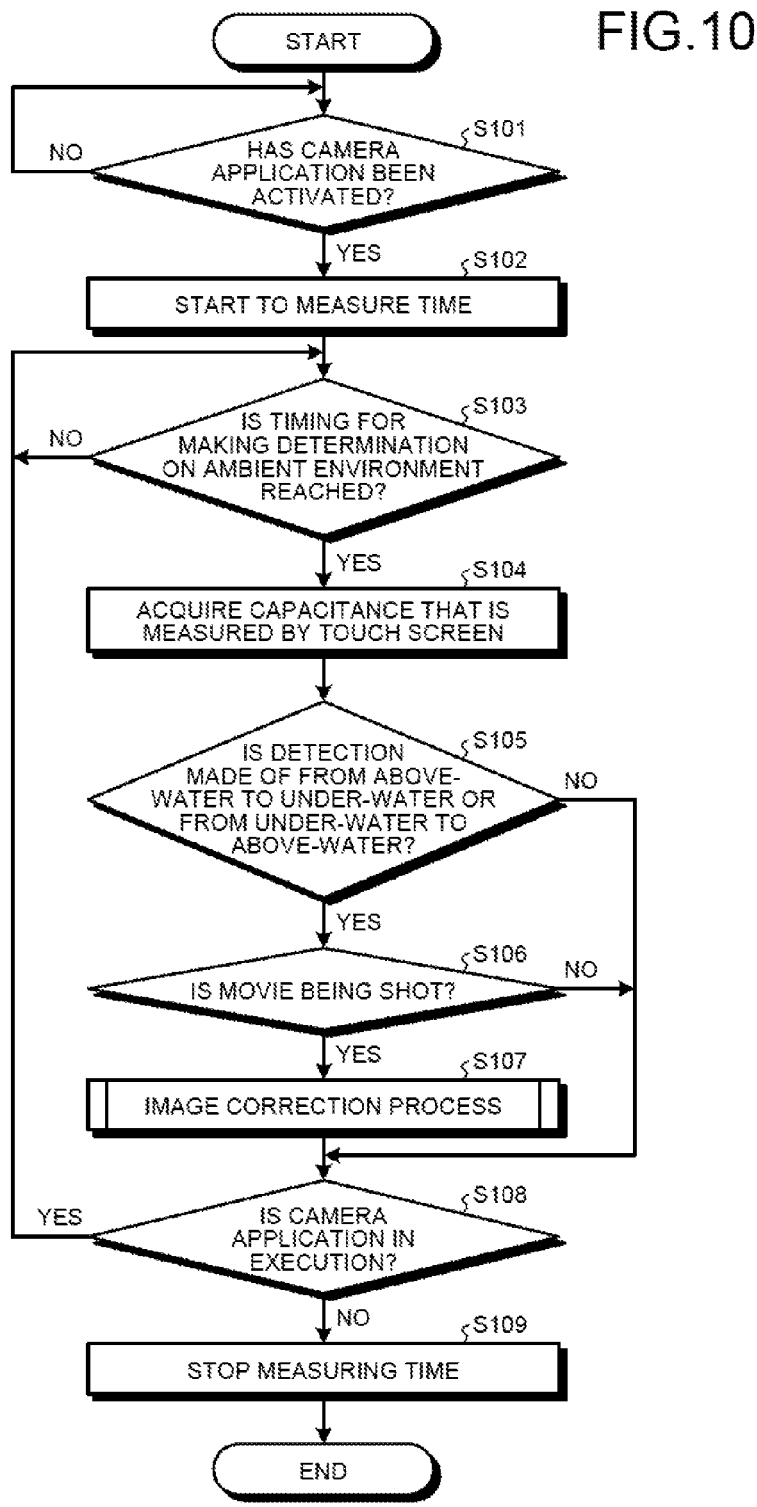
FIG. 10 is a flowchart that illustrates an example of the process of the smartphone according to embodiments.
Figure 11:
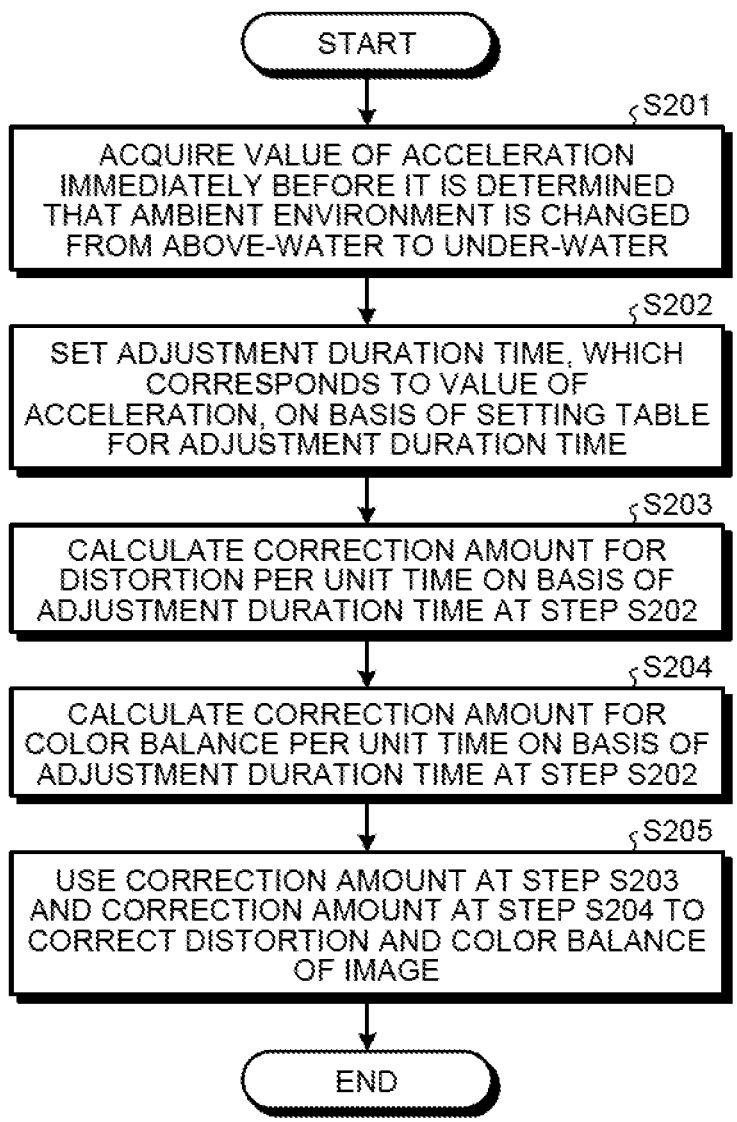
FIG. 11 is a flowchart that illustrates another example of the process of the smartphone according to embodiments.
Figure 12:
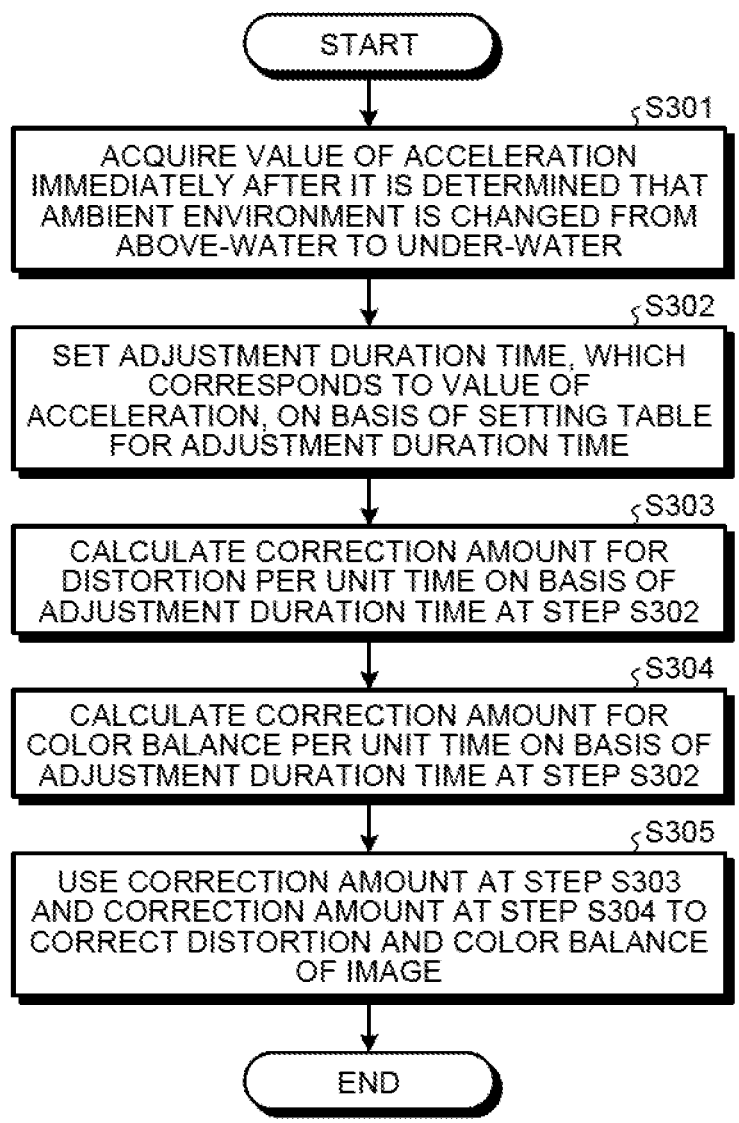
FIG. 12 is a flowchart that illustrates another example of the process of the smartphone according to embodiments.

With reference to FIGS. 10, 11, and 12, an explanation is given of the flow of a process that is performed by the smartphone 1 according to embodiments. FIGS. 10, 11, and 12 are flowcharts that illustrate examples of the process of the smartphone 1 according to embodiments. The processes, illustrated in FIGS. 10, 11, and 12, are implemented when the controller 10 executes the control program 9A, or the like, stored in the storage 9.

FIG. 10 illustrates the flow of the overall process that is performed by the smartphone 1. As illustrated in FIG. 10, the controller 10 determines whether the camera application 9B has been activated (Step S101).

If the camera application 9B has not been activated as a result of the determination (No at Step S101), the controller 10 repeats the determination.

Conversely, if the camera application 9B has been activated as a result of the determination (Yes at Step S101), the controller 10 starts to measure the time (Step S102).

Next, the controller 10 determines whether the timing for making a determination on the ambient environment is reached (Step S103).

If the timing for determining the ambient environment is not reached as a result of the determination (No at Step S103), the controller 10 repeats the determination.

Conversely, if the timing for determining the ambient environment is reached as a result of the determination (Yes at Step S103), the controller 10 acquires the capacitance that is measured by the touch screen 2B (Step S104).

Next, on the basis of the capacitance that is acquired at Step S104, the controller 10 determines whether it detects a change in the ambient environment of the subject device from above-water to under-water or a change in the ambient environment of the subject device from under-water to above-water (Step S105).

If a change in the ambient environment of the subject device from above-water to under-water or a change in the ambient environment of the subject device from under-water to above-water is detected as a result of the determination (Yes at Step S105), the controller 10 determines whether a movie is being shot (Step S106).

If a movie is being shot as a result of the determination (Yes at Step S106), the controller 10 performs an image correction process (Step S107).

Next, the controller 10 determines whether the camera application 9B is in execution (Step S108).

If the camera application 9B is in execution as a result of the determination (Yes at Step S108), the controller 10 returns to the determination at the above-described Step S103.

Conversely, if the camera application 9B is not in execution as a result of the determination (No at Step S108), the controller 10 stops measuring the time (Step S109) and terminates the process that is illustrated in FIG. 10.

If a movie is not being shot as a result of the determination at the above-described Step S106 (No at Step S106), the controller 10 proceeds to the determination at the above-described Step S108.

If a change in the ambient environment of the subject device from above-water to under-water or a change in the ambient environment of the subject device from under-water to above-water is not detected as a result of the determination at the above-described Step S105 (No at Step S105), the controller 10 proceeds to the determination at the above-described Step S108.

FIG. 11 illustrates an image correction process in a case where the adjustment duration time for image correction is set by using the acceleration that is measured immediately before the smartphone 1 enters water. As illustrated in FIG. 11, the controller 10 acquires, from the acceleration sensor 15, the value of the acceleration that is measured immediately before it is determined that the ambient environment is changed from above-water to under-water (Step S201).

Next, the controller 10 sets the adjustment duration time, which corresponds to the value of the acceleration that is acquired at Step S201, on the basis of the setting table 9D for the adjustment duration time (Step S202).

Then, on the basis of the adjustment duration time that is set at Step S202, the controller 10 divides the automatic correction amount for distortion by the adjustment duration time, thereby calculating the amount of change per unit time with regard to the correction amount for distortion (Step S203).

Then, on the basis of the adjustment duration time that is set at Step S202, the controller 10 divides the automatic correction amount for color balance by the adjustment duration time, thereby calculating the amount of change per unit time with regard to the correction amount for color balance (Step S204).

Next, the controller 10 uses the correction amount, calculated at Step S203, and the correction amount, calculated at Step S204, and uses the adjustment duration time for image correction to correct the distortion and the color balance of the image (Step S205) and terminates the image correction process that is illustrated in FIG. 11.

FIG. 12 illustrates an image correction process in a case where the adjustment duration time is set by using the acceleration that is measured immediately after the smartphone 1 enters water. As illustrated in FIG. 12, the controller 10 acquires, from the acceleration sensor 15, the value of the acceleration that is measured immediately after it is determined that the ambient environment is changed from above-water to under-water (Step S301).

Next, the controller 10 sets the adjustment duration time, which corresponds to the value of the acceleration that is acquired at Step S301, on the basis of the setting table 9D for the adjustment duration time (Step S302).

Then, on the basis of the adjustment duration time that is set at Step S302, the controller 10 divides the automatic correction amount for distortion by the adjustment duration time, thereby calculating the amount of change per unit time with regard to the correction amount for distortion (Step S303).

Then, on the basis of the adjustment duration time that is set at Step S302, the controller 10 divides the automatic correction amount for color balance by the adjustment duration time, thereby calculating the amount of change per unit time with regard to the correction amount for color balance (Step S304).

Next, the controller 10 uses the correction amount, calculated at Step S303, and the correction amount, calculated at Step S304, and uses the adjustment duration time to correct the distortion and the color balance of the image (Step S305) and terminates the adjustment for the image correction process that is illustrated in FIG. 12.

In the examples illustrated in FIGS. 11 and 12, an explanation is given of the image correction process in a case where the ambient environment of the smartphone 1 is changed from above-water to under-water; however, the same processes as those illustrated in the examples of FIGS. 11 and 12 are applicable to the image correction process in a case where the ambient environment of the smartphone 1 is changed from under-water to above-water.

According to embodiments, with regard to the smartphone 1, for example, if the ambient environment of the subject device is changed from above-water to under-water, the adjustment duration time for image correction is set in accordance with the value of the acceleration that acts on the subject device. The adjustment duration time is adjusted such that it becomes longer as the value of the acceleration is smaller. Therefore, the adjustment duration time becomes longer as the speed of the smartphone 1 entering water is lower, whereby distortion, or the like, of an image is corrected slowly. Therefore, for example, if the image, displayed on the display 2A, is automatically corrected due to a change in the ambient environment of the subject device during the shooting of a movie, it is possible to reduce uncomfortable feelings of the user who views the image on the display 2A. According to embodiments, as the correction of images is automatically conducted in accordance with a change in the ambient environment of the subject device, it is possible to eliminate the need for manual operations to correct images, and it is possible to reduce user's time and effort. Thus, according to embodiments, the method of correcting images may be improved.

According to embodiments, an explanation is given of the example where the correction of the movie, which is being shot by the smartphone 1, is conducted in real time. However, the embodiments are not limited to this example, and the correction of the shot movie may be conducted when the movie is reproduced after it is shot. In order to conduct this correction, the smartphone 1 may store the value of the acceleration during the movie shooting in relation to the identification information on the movie in the storage 9 or may store the prepared correction parameter in relation to the identification information on the movie in the storage 9.

The processes, explained in embodiments, are applicable to not only the smartphone 1 but also electronic devices that have an image capturing function, such as digital cameras, mobile phones, or tablets.

Descriptions are given of the characteristic embodiments to disclose the technology according to the attached claims fully and clearly. However, the attached claims do not need to be limited to embodiments, and they may be implemented by using all the modifications and alternative configurations that may be invented by a person skilled in the art within the scope of the fundamental matters, described in this specification.

What is claimed is:

1. An electronic device comprising:
   an image acquiring unit;
   a display that is configured to display an image acquired by the image acquiring unit;
   a first sensor that is configured to measure a first information on an environment around the electronic device for detecting a change in the environment;
   at least one controller that is configured to detect the change and, when the change is detected, conduct correction of an image acquired by the image acquiring unit; and
   a second sensor that is configured to measure a second information on a movement of the electronic device, wherein
   the at least one controller is configured to, when shooting of a movie has been started by the image acquiring unit before the change is detected, set an adjustment duration time for correction of the image in accordance with the second information,
   the electronic device further comprises a storage that is configured to store a correspondence relationship between a value of an acceleration and the adjustment duration time that is adjusted such that, as the value of the acceleration is smaller, a processing time of the correction becomes longer,
   the second sensor includes an acceleration sensor,
   the second sensor is configured to measure a value of an acceleration that acts on the electronic device as the second information, and
   the controller is configured to set the adjustment duration time, which corresponds to the value of the acceleration, in accordance with the correspondence relationship that is stored in the storage.

2. The electronic device according to claim 1, wherein the change includes at least any one of a change from above-water to under-water and a change from under-water to above-water.

3. The electronic device according to claim 1, wherein the controller is configured to set the adjustment duration time before the change is detected.

4. The electronic device according to claim 1, wherein the controller is configured to set the adjustment duration time after the change is detected.

5. The electronic device according to claim 1, wherein the correction includes correction on distortion of an image acquired by the image acquiring unit.

6. The electronic device according to claim 1, wherein the correction includes correction on a color balance of an image acquired by the image acquiring unit.

7. A control method that is implemented by an electronic device including an image acquiring unit and a display that is configured to display an image acquired by the image acquiring unit, the control method comprising:
   measuring a first information on an environment around the electronic device for detecting a change in the environment;
   detecting the change;
   conducting correction of an image acquired by the image acquiring unit when the change is detected;
   measuring, by an acceleration sensor, a value of an acceleration that acts on the electronic device as a second information on a movement of the electronic device; and
   setting an adjustment duration time for correction of the image in accordance with the second information in such a manner that, as the value of the acceleration of the electronic device measured by the acceleration sensor is smaller, a processing time of the correction becomes longer when shooting of a movie has been started by the image acquiring unit before the change is detected.

8. A non-transitory storage medium that stores a control program for causing, when executed by an electronic device including an image acquiring unit and a display that is configured to display an image acquired by the image acquiring unit, the electronic device to execute:
   measuring a first information on an environment around the electronic device for detecting a change in the environment;
   detecting the change;
   conducting correction of the image acquired by the image acquiring unit when the change is detected;
   measuring, by an acceleration sensor, a value of an acceleration that acts on the electronic device as a second information on a movement of the electronic device; and
   setting an adjustment duration time for correction of the image in accordance with the second information in such a manner that, as the value of the acceleration of the electronic device measured by the acceleration sensor is smaller, a processing time of the correction becomes longer when shooting of a movie has been started by the image acquiring unit before the change is detected.

* * * * *